United States Patent
Nabata et al.

(10) Patent No.: US 9,204,223 B2
(45) Date of Patent: Dec. 1, 2015

(54) ELECTRONIC DEVICE

(71) Applicant: KYOCERA CORPORATION, Kyoto (JP)

(72) Inventors: Toshihisa Nabata, Sagamihara (JP); Satoshi Mizuta, Sagamihara (JP); Tomoaki Miyano, Kameyama (JP); Kiyokazu Sato, Yokohama (JP); Akio Kihara, Kawasaki (JP); Shun Kazama, Yokohama (JP); Yasuhiro Katayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/862,333

(22) Filed: Apr. 12, 2013

(65) Prior Publication Data
US 2013/0272549 A1    Oct. 17, 2013

(30) Foreign Application Priority Data

Apr. 12, 2012  (JP) .................................. 2012-091021

(51) Int. Cl.
| | |
|---|---|
| *H04R 25/00* | (2006.01) |
| *H04R 17/00* | (2006.01) |
| *G06F 1/16* | (2006.01) |
| *H04M 1/02* | (2006.01) |
| *H04M 1/03* | (2006.01) |
| *H04R 1/08* | (2006.01) |

(52) U.S. Cl.
CPC .............. *H04R 17/00* (2013.01); *G06F 1/1658* (2013.01); *H04M 1/0266* (2013.01); *H04M 1/03* (2013.01); *H04R 1/08* (2013.01); *H04R 2460/13* (2013.01)

(58) Field of Classification Search
USPC .......................... 381/114, 173, 190, 151, 364
See application file for complete search history.

(56) References Cited

U.S. PATENT DOCUMENTS

| | | | |
|---|---|---|---|
| 3,728,741 | A | 4/1973 | Lepor |
| 6,259,188 | B1 | 7/2001 | Woodard et al. |
| 6,427,017 | B1 | 7/2002 | Toki |

(Continued)

FOREIGN PATENT DOCUMENTS

| | | |
|---|---|---|
| EP | 1542064 A1 | 6/2005 |
| EP | 2793483 A1 | 10/2014 |

(Continued)

OTHER PUBLICATIONS

The extended European search report issued on Jul. 3, 2013, which corresponds to EP13163442.0 and is related to U.S. Appl. No. 13/862,333.

(Continued)

*Primary Examiner* — Davetta W Goins
*Assistant Examiner* — Amir Etesam
(74) *Attorney, Agent, or Firm* — Studebaker & Brackett PC

(57) ABSTRACT

In order to be appropriately usable as an electric device for vibrating a panel attached to a housing, an electronic device including a piezoelectric element; a housing having a first principle plane having the piezoelectric element fixed thereto and a second principle plane opposite to the first principle plane; and a lid member having a joint portion for removably joining to the second principle plane; causes the housing to generate sound transmitted by vibrating a part of a human body, such that the piezoelectric element is provided on a first side in a first direction parallel to the first principle plane, and a joint position of the joint portion is provided on a second side opposite to the first side in the first direction.

14 Claims, 8 Drawing Sheets

(56) References Cited

U.S. PATENT DOCUMENTS

| | | | |
|---|---|---|---|
| 7,050,600 | B2 | 5/2006 | Saiki et al. |
| 7,174,025 | B2 | 2/2007 | Azima et al. |
| 7,421,088 | B2 * | 9/2008 | Cranfill et al. ............... 381/386 |
| 7,512,425 | B2 | 3/2009 | Fukuda |
| 7,657,042 | B2 | 2/2010 | Miyata |
| 8,199,959 | B2 | 6/2012 | Miyata |
| 8,200,289 | B2 | 6/2012 | Joo et al. |
| 8,279,623 | B2 * | 10/2012 | Idzik et al. .................... 361/814 |
| 8,848,967 | B2 | 9/2014 | Joo |
| 2001/0026625 | A1 | 10/2001 | Azima et al. |
| 2002/0065113 | A1 | 5/2002 | Mori |
| 2002/0067841 | A1 | 6/2002 | Bank et al. |
| 2002/0076061 | A1 | 6/2002 | Ashtiani et al. |
| 2004/0109571 | A1 | 6/2004 | Yoshimine |
| 2005/0002537 | A1 | 1/2005 | Azima et al. |
| 2005/0057527 | A1 | 3/2005 | Takenaka et al. |
| 2005/0129267 | A1 | 6/2005 | Azima et al. |
| 2005/0169112 | A1 | 8/2005 | Shimizu |
| 2006/0093165 | A1 | 5/2006 | Kamimura et al. |
| 2006/0140424 | A1 | 6/2006 | Kobayashi |
| 2006/0227981 | A1 | 10/2006 | Miyata |
| 2006/0286998 | A1 | 12/2006 | Fukuda |
| 2007/0057909 | A1 | 3/2007 | Schobben et al. |
| 2007/0097073 | A1 | 5/2007 | Takashima et al. |
| 2008/0268921 | A1 | 10/2008 | Taniguchi et al. |
| 2009/0103767 | A1 | 4/2009 | Kuroda et al. |
| 2009/0147969 | A1 | 6/2009 | Kinouchi et al. |
| 2009/0290746 | A1 | 11/2009 | Miyata |
| 2009/0296976 | A1 | 12/2009 | Tsai et al. |
| 2010/0225600 | A1 | 9/2010 | Dai et al. |
| 2010/0278362 | A1 | 11/2010 | Kim |
| 2011/0234459 | A1 | 9/2011 | Yabe |
| 2012/0063074 | A1 | 3/2012 | Matsuda et al. |
| 2013/0051585 | A1 | 2/2013 | Karkkainen et al. |
| 2013/0308798 | A1 | 11/2013 | Lee |
| 2014/0342783 | A1 | 11/2014 | Suzuki et al. |
| 2015/0023531 | A1 | 1/2015 | Horii et al. |

FOREIGN PATENT DOCUMENTS

| | | |
|---|---|---|
| JP | S62-86799 U | 6/1987 |
| JP | H07-296786 A | 11/1995 |
| JP | H08-223675 A | 8/1996 |
| JP | H09-247795 A | 9/1997 |
| JP | H11-25940 A | 1/1999 |
| JP | 2001-007546 A | 1/2001 |
| JP | 2002-027065 A | 1/2002 |
| JP | 2002-185593 A | 6/2002 |
| JP | 2002-219413 A | 8/2002 |
| JP | 2002-232542 A | 8/2002 |
| JP | 2002-305569 A | 10/2002 |
| JP | 2004-187031 A | 7/2004 |
| JP | 2005-214793 A | 8/2005 |
| JP | 2005-236352 A | 9/2005 |
| JP | 2005-284054 A | 10/2005 |
| JP | 2005-348193 A | 12/2005 |
| JP | 2007-502594 A | 2/2007 |
| JP | 2007-082009 A | 3/2007 |
| JP | 2007-180827 A | 7/2007 |
| JP | 2007-189578 A | 7/2007 |
| JP | 2008-017398 A | 1/2008 |
| JP | 2008-270879 A | 11/2008 |
| JP | 2009-118396 A | 5/2009 |
| JP | 2011-091719 A | 5/2011 |
| JP | 2013-110535 A | 6/2013 |
| JP | 5255142 B1 | 8/2013 |
| JP | 2013-207795 A | 10/2013 |
| JP | 2013-207796 A | 10/2013 |
| JP | 2013-223238 A | 10/2013 |
| JP | 2013-232874 A | 11/2013 |
| JP | 2013-255212 A | 12/2013 |
| KR | 10-1068254 B1 | 9/2011 |
| WO | 2004/023199 A1 | 3/2004 |
| WO | 2004/051967 A1 | 6/2004 |
| WO | 2006/059679 A1 | 6/2006 |
| WO | 2006/114985 A1 | 11/2006 |
| WO | 2012/025783 A1 | 3/2012 |

OTHER PUBLICATIONS

An Office Action issued by the Japanese Patent Office on Aug. 28, 2012, which corresponds to Japanese Patent Application No. 2012-148834 and is related to U.S. Appl. Nos. 14/002,357 and 13/862,333.

An Office Action issued by the Japanese Patent Office on Feb. 5, 2013, which corresponds to Japanese Patent Application No. 2012-148834 and is related to U.S. Appl. Nos. 14/002,357 and 13/862,333.

An Office Action issued by the Japanese Patent Office on Apr. 23, 2013, which corresponds to Japanese Patent Application No. 2012-148834 and is related to U.S. Appl. Nos. 14/002,357 and 13/862,333.

An Office Action issued by the Japanese Patent Office on Aug. 26, 2014, which corresponds to Japanese Patent Application No. 2014-016081 and is related to U.S. Appl. Nos. 14/002,357 and 13/862,333.

An Office Action issued by the Japanese Patent Office on Aug. 26, 2014, which corresponds to Japanese Patent Application No. 2014-016048 and is related to U.S. Appl. Nos. 14/002,668 and 13/862,333.

An Office Action issued by the Japanese Patent Office on Jul. 31, 2012, which corresponds to Japanese Patent Application No. 2012-148844 and is related to U.S. Appl. Nos. 14/002,668 and 13/862,333.

An Office Action issued by the Japanese Patent Office on Jan. 8, 2013, which corresponds to Japanese Patent Application No. 2012-148844 and is related to U.S. Appl. Nos. 14/002,668 and 13/862,333.

An Office Action issued by the Japanese Patent Office on Jul. 31, 2012, which corresponds to Japanese Patent Application No. 2012-148798 and is related to U.S. Appl. Nos. 14/002,675 and 13/862,333.

An Office Action issued by the Japanese Patent Office on Jan. 8, 2013, which corresponds to Japanese Patent Application No. 2012-148798 and is related to U.S. Appl. Nos. 14/002,675 and 13/862,333.

An Office Action issued by the Japanese Patent Office on Apr. 23, 2013, which corresponds to Japanese Patent Application No. 2012-148798 and is related to U.S. Appl. Nos. 14/002,675 and 13/862,333.

An Office Action issued by the Japanese Patent Office on Jul. 31, 2012, which corresponds to Japanese Patent Application No. 2012-148773 and is related to U.S. Appl. Nos. 14/002,699 and 13/862,333.

An Office Action issued by the Japanese Patent Office on Jan. 8, 2013, which corresponds to Japanese Patent Application No. 2012-148773 and is related to U.S. Appl. Nos. 14/002,699 and 13/862,333.

An Office Action issued by the Japanese Patent Office on Jul. 31, 2012, which corresponds to Japanese Patent Application No. 2012-148809 and is related to U.S. Appl. Nos. 14/002,698 and 13/862,333.

An Office Action issued by the Japanese Patent Office on Jan. 8, 2013, which corresponds to Japanese Patent Application No. 2012-148809 and is related to U.S. Appl. Nos. 14/002,698 and 13/862,333.

International Search Report; PCT/JP2013/002789; issued on Jun. 11, 2013, which corresponds to U.S. Appl. Nos. 14/002,357 and 13/862,333.

International Search Report; PCT/JP2013/002088; issued on May 14, 2013, which corresponds to U.S. Appl. Nos. 14/002,668 and 13/862,333.

International Search Report; PCT/JP2013/002530; issued on May 14, 2013, which corresponds to U.S. Appl. Nos. 14/002,675 and 13/862,333.

International Search Report; PCT/JP2013/002874; issued on Jun. 11, 2013, which corresponds to U.S. Appl. Nos. 14/002,699 and 13/862,333.

International Search Report; PCT/JP2013/002138; issued on May 14, 2013, which corresponds to U.S. Appl. Nos. 14/002,698 and 13/862,333.

An Office Action; "Notice of Reasons for Rejection," issued by the Japanese Patent Office on Dec. 2, 2014, which corresponds to Japanese Patent Application No. 2014-016082 and is related to U.S. Appl. Nos. 14/002,675 and 13/862,333; with English language concise explanation.

An Office Action; "Notice of Reasons for Rejection," issued by the Japanese Patent Office on Dec. 2, 2014, which corresponds to Japanese Patent Application No. 2014-016046 and is related to U.S. Appl. Nos. 14/002,698 and 13/862,333; with English language concise explanation.

(56) References Cited

OTHER PUBLICATIONS

An Office Action; "Notice of Reasons for Rejection," issued by the Japanese Patent Office on Feb. 10, 2015, which corresponds to Japanese Patent Application No. 2012-089203 and is related to U.S. Appl. Nos. 13/860,150 and 13/862,333; with English language concise explanation.

An Office Action; "Notice of Reasons for Rejection," issued by the Japanese Patent Office on Mar. 17, 2015, which corresponds to Japanese Patent Application No. 2014-016048 and is related to U.S. Appl. Nos. 14/002,668 and 13/862,333; with English language concise explanation.

An Office Action; "Notice of Reasons for Rejection," issued by the Japanese Patent Office on Mar. 24, 2015, which corresponds to Japanese Patent Application No. 2012-091021 and is related to U.S. Appl. No. 13/862,333; with English language concise explanation.

The extended European search report issued by the European Patent Office on Aug. 5, 2015, which corresponds to European Patent Application No. 13780570.1—1910 and is related to U.S. Appl. Nos. 14/002,699 and 13/862,333.

The extended European search report issued by the European Patent Office on Jul. 30, 2015, which corresponds to European Patent Application No. 13767862.9—1972 and is related to U.S. Appl. Nos. 14/807,865 and 13/862,333.

\* cited by examiner

(12)  US 9,204,223 B2

ELECTRONIC DEVICE

CROSS REFERENCE TO RELATED APPLICATION

This application claims priority to and the benefit of Japanese Patent Application No. 2012-091021 (filed on Apr. 12, 2012), the entire contents of which are incorporated herein by reference.

FIELD

Embodiments discussed herein relate to an electronic device that vibrates a panel by applying a predetermined electric signal (audio signal) to a piezoelectric element, and that transmits air conduction sound and vibration sound to a user by transmitting vibration of the panel through the user's body.

BACKGROUND

Patent document 1 describes an electronic device such as a mobile phone for transmitting the air conduction sound and bone conduction sound to the user. Patent document 1 also describes that the air conduction sound is sound transmitted to the auditory nerve of the user as vibration of the air caused by vibration of an object is transmitted to the eardrum through the ear canal and vibrates the eardrum. Patent document 1 further describes that the human body vibration sound is sound transmitted to the auditory nerve of the user through a part of the body (for example, the cartilage of the external ear) of the user in contact with a vibrating object.

Patent Document 1 describes a telephone equipment having a vibrator in a corrugated plate shape constituted by using a piezoelectric bimorph and a flexible substance attached to an external surface of a housing via an elastic member. Patent document 1 also describes that, when a voltage is applied on the piezoelectric bimorph of the vibrator, the vibrator vibrates in a curved manner as piezoelectric material expands and contracts in a longitudinal direction and the air conduction sound and the human body vibration sound are transmitted to the user when the user contacts the vibrator to the auricle.

CITATION LIST

Patent Document 1: JP2005-348193(A)

SUMMARY

The electronic device according to Patent Document 1 includes the vibrator attached to the external surface of the housing of a mobile phone and the like. Therefore, no consideration is made for a problem when a panel attached to the housing is vibrated.

An electronic device that may be appropriately used as an electronic device for vibrating the panel attached to the housing is discussed.

An electronic device according to one embodiment includes a piezoelectric element, a housing having a first principle plane having the piezoelectric element fixed thereto and a second principle plane opposite to the first principle plane, and a lid member having a joint portion for removably joining to the second principle plane. The electronic device causes the housing to generate sound transmitted by vibrating a part of a human body, such that the piezoelectric element is provided on a first side in a first direction parallel to the first principle plane, and a joint position of the joint portion is provided on a second side opposite to the first side in the first direction. The electronic device may further cause the housing to generate air-conducted sound.

The housing may include a vibrating plate having the piezoelectric element fixed thereto and a base portion for joining the vibrating plate and the joint portion.

The joint portion may have a packing portion arranged along a periphery thereof. The base may have a groove for accommodating the packing portion.

A length of the first direction of the vibrating plate in a planar view is preferably equal to or longer than a length between the antitragus and the inferior antihelix crus. A length of a direction intersecting with the first direction of the vibrating plate in the planar view is preferably equal to or longer than a length between the tragus and the antihelix.

The piezoelectric element may be attached and fixed to the vibrating plate by using a joint member. The joint member may be non-heating type hardening adhesive or a double-sided tape.

The piezoelectric element may be attached to the housing by using the joint member. The joint member may be the non-heating type hardening adhesive or the double-sided tape.

The vibrating plate may constitute any of or all of a display unit, an input unit and a display unit cover.

The piezoelectric element may be fixed to the vibrating plate at a position outside a region of the vibrating plate overlapping with the display unit in the planar view.

DESCRIPTION OF EMBODIMENTS

According to the electronic device discussed herein, the electronic device for vibrating a panel attached to the housing may be appropriately used.

Figure 1:
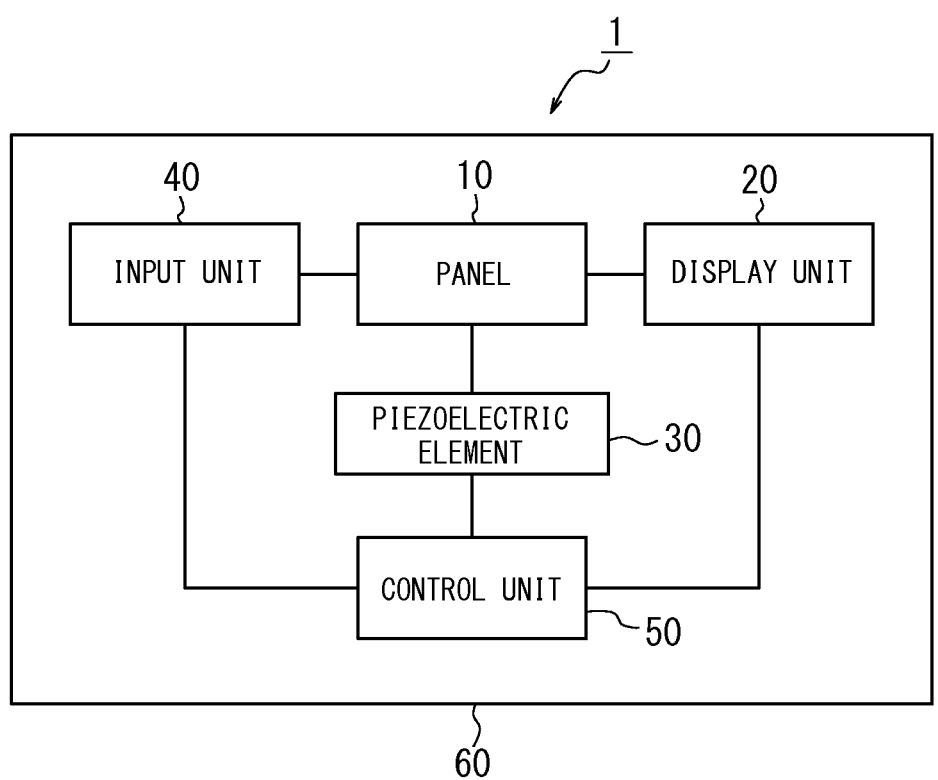
FIG. 1 illustrates a functional block of an electronic device according to one embodiment.

Embodiments of the present invention will be described in detail with reference to the accompanying drawings. FIG. 1 is a diagram illustrating a functional block of an electronic device 1 according to one embodiment. The electronic device 1 is, for example, a mobile phone (smart phone) and includes a panel 10, a display unit 20, a piezoelectric element 30, an input unit 40 and a control unit 50. The panel 10 serves as an example of a "vibrating plate" according to the present embodiment. In the present embodiment, the electronic device 1 functions as a mobile phone such that the piezoelectric element 30 causes vibration of the panel 10, thereby sound transmitted through a human body is generated. The sound transmitted through a human body (or, human body vibration sound) vibrates the middle ear or the inner year through soft tissues (for example, the cartilage). A configuration of the electronic device 1 will be described below in detail. The electronic device 1 includes a housing 60 having the panel 10 fixed thereto containing the display unit 20, the piezoelectric element 30, the input unit 40 and the control unit 50.

The panel 10 is a touch panel for detecting a contact or a cover panel for protecting the display unit 20. The panel 10 may be made of, for example, the glass or synthetic resin such as acrylic. Preferably, the panel 10 is in a plate shape. Or, the panel 10 may be a flat plate or a curved panel having a smoothly sloping surface. When the panel 10 is the touch panel, the panel 10 detects a contact by a user's finger, a pen or a stylus pen. The touch panel may be any of a capacitive type, a resistive film type, a surface acoustic wave type (or an ultrasonic type), an infrared type, an electromagnetic type, a load detection type and the like.

The display unit 20 includes a display device such as a liquid crystal display, an organic EL display, an inorganic EL display or the like. The display unit 20 is provided to a rear face of the panel 10. The display unit 20 is disposed on the rear face of the panel 10 by using a joint member (for example, adhesive). The display unit 20 may be disposed separately from the panel 10 and supported by the housing of the electronic device 1.

The piezoelectric element 30 is an element that, when an electronic signal (a voltage) is applied thereto, expands and contracts, or curls, according to an electromechanical coupling coefficient of constituting material. The element may be made of, for example, ceramic or crystal. The piezoelectric element 30 may be a unimorph, a bimorph or a laminated piezoelectric element. The laminated piezoelectric element includes a laminated bimorph element having laminated bimorphs (in 16 layers or 24 layers, for example). The laminated piezoelectric element has a laminated structure constituted by using a plurality of dielectric layers including, for example, PZT (lead zirconate titanate) and electrode layers arranged between the plurality of dielectric layers. Upon application of the electric signal (voltage), the unimorph expands and contracts, and the bimorph bends.

The piezoelectric element 30 is disposed on the rear face of the panel 10 (on an inner surface of the electronic device 1). The piezoelectric element 30 is attached to the panel 10 by using a joint member (for example, a double-sided tape). Or, the piezoelectric element 30 may be attached to the panel 10 via an intermediate member (for example, a plate). The piezoelectric element 30 is disposed on the rear face of the panel 10 separated from an inner surface of the housing 60 by a predetermined distance. Preferably, the piezoelectric element 30 is separated from the inner surface of the housing 60 by the predetermined distance when expands and contracts, or bends, as well. That is, the distance between the piezoelectric element 30 and the inner surface of the housing 60 is preferably larger than a maximum deformation amount of the piezoelectric element 30.

The input unit 40 receives an input operation from a user and constituted by using, for example, an operation button (operation key). When the panel 10 is the touch panel, the panel 10 also detects the contact by the user, thereby the input operation by the user is received.

The control unit 50 is a processor for controlling the electronic device 1. The control unit 50 applies a predetermined electric signal (voltage corresponding to an audio signal) on the piezoelectric element 30. The voltage applied on the piezoelectric element 30 by the control unit 50 may be, for example, ±15 V, which is higher than an applied voltage ±5 V of a so-called panel speaker aiming conduction of air conduction sound, instead of vibration sound through a human body. Thereby, when the user presses the panel 10 against a user's body applying a force of 3 N or larger (for example, a force of 5 N to 10 N), the panel 10 may be sufficiently vibrated generating the vibration sound through a part of the user's body. The application voltage may be appropriately adjusted based on fixing intensity of the panel 10 to the housing or a support member, or on performance of the piezoelectric element 30.

When the control unit 50 applies the electric signal to the piezoelectric element 30, the piezoelectric element 30 expands and contracts, or bends, in a longitudinal direction. At this time, the panel 10 having the piezoelectric element 30 attached thereto is deformed following expansion and contraction or bend of the piezoelectric element 30 and thus vibrates. The panel 10 flexes by expansion and contraction or bend of the piezoelectric element 30. The panel 10 is directly bent by the piezoelectric element 30. The panel 10 being directly bent by the piezoelectric element 30 differs from a phenomenon adapted to a conventional panel speaker, such that inertia force of a piezoelectric actuator having a piezoelectric element disposed within a case causes vibration added to a certain region of the panel, and thereby the panel is deformed. The panel 10 being directly bent by the piezoelectric element 30 includes a meaning that expansion and contraction or bend (flex) of a piezoelectric element directly bends a panel via a joint member or via a joint member and an appropriately used reinforcement member. Therefore, the panel 10 generates the air conduction sound and, when a part of the user's body contacts the panel 10, generates the vibration sound through the part of the body. For example, the control unit 50 may apply an electric signal corresponding to, for example, an audio signal of voice of a person on the other end of call, such that the air conduction sound and the vibration sound corresponding to the audio signal are generated. The audio signal may be music including an incoming call melody or a song. The audio signal associated with the electric signal may be based on music data stored in an internal memory of the electronic device 1 or on music data stored in an external server to be played via a network.

The panel 10 vibrates, as well as in an attachment region where the piezoelectric element 30 is attached, a region separated from the attachment region. The panel 10 has a plurality of regions for vibrating in a direction intersecting with a principal surface of the panel 10 in a vibration region. In each of the plurality of areas, a value of vibration amplitude changes from plus to minus or vice versa with time. The panel 10 vibrates in such a manner that, at a given moment, parts with relatively large vibration amplitude and parts with relatively small vibration amplitude appear to be randomly or periodically distributed approximately all over the entire panel 10. That is, a plurality of wave vibrations are detected over the entire panel 10. In order to prevent attenuation of the vibration of the panel 10 described above when the user presses the panel 10 against the user's body at the force of 5 N to 10 N for example, the control unit 50 may apply a voltage of ±15 V to the piezoelectric element 30. Thereby, the user may hear the sound by contacting the ear to the region separated from the attachment area of the panel 10 described above.

Figure 2:
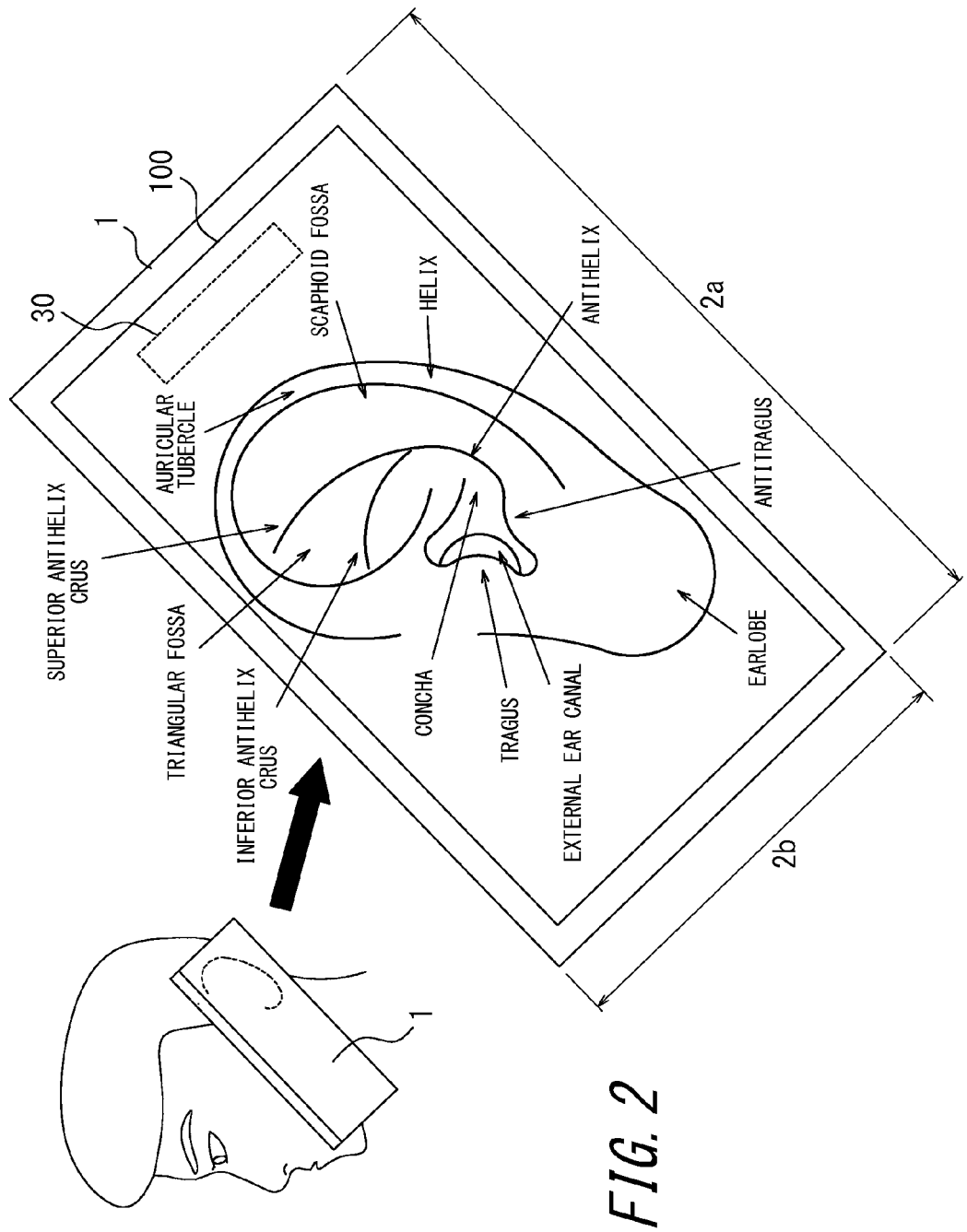
FIG. 2 illustrates a panel in a preferred shape.

Here, the panel 10 may be in size approximately similar to the user's ear. Or, as illustrated in FIG. 2, the panel 10 may be larger than the user's ear. In this case, since the entire ear is likely to be covered by the panel 10 of the electronic element 1 when the user listens to the sound, surrounding sound (noises) entering the ear canal may be decreased. The panel 10 needs to vibrate in a region larger than an area having a length corresponding to a distance between the lower antihelix crus (the inferior antihelix crus) and the antitragus and a width corresponding to a distance between the tragus and the antihelix. Preferably, the panel 10 vibrates in a region having a length corresponding to a distance between a part near the upper antihelix crus (the superior antihelix crus) of the helix and the lobe and a width corresponding to a distance between the tragus and a part near the antihelix of the helix. In this example, a length direction corresponds to a longitudinal direction 2a in which the panel 10 stretches, and the piezoelectric element 30 is disposed between a center of the length direction and one end thereof. Also, a width direction corresponds to a direction 2b orthogonal to the longitudinal direction. The area having such length and width may be in a rectangular shape, or in an oval shape having the above length as a long diameter and the above width as a short diameter. An average size of a Japanese person' ear may be obtained from Database of Japanese Body Dimension Data (1992-1994) provided by Research Institute of Human Engineering for Quality Life (HQL). When the panel 10 is equal to or larger than the average ear size of Japanese people, it is considered that the panel 10 may cover most of foreign nationals' entire ears. Having the size and the shape described above, the panel 10 may cover the user's ear and have an allowance for misalignment relative to the ear.

The electronic device 1 described above, by vibrating the panel 10, may transmit the air conduction sound and the human vibration sound through a part of the user's body (for example, the cartilage of the outer ear). Therefore, when sound at a volume similar to that of a conventional dynamic receiver is output, less sound is transmitted around the electronic device 1 through air vibration due to vibration of the panel 10, in comparison to the dynamic receiver. Accordingly, the electronic device 1 is suitable for listening to, for example, a recorded message in a train or the like.

Also, the electronic device 1 described above transmits the human vibration sound by vibrating the panel 10. Therefore, when the user is wearing an earphone or a headphone, for example, the user may hear the sound via the earphone or the headphone and a part of the user's body by contacting the electronic device 1 to the earphone or the headphone.

The electronic device 1 described above transmits the sound to the user by vibrating the panel 10. Therefore, when the electronic device 1 does not have a separate dynamic receiver, an opening (a sound opening) for transmitting voice does not need to be formed on the housing of the electronic device 1, which enables a simple waterproof structure of the electronic device 1. When the electronic device 1 has the dynamic receiver, the sound opening is preferably sealed with a member that ventilates while blocking liquid. Such a member for ventilating while blocking liquid may be, for example, Gore-Tex (registered trademark).

(First Embodiment)

Figure 3:
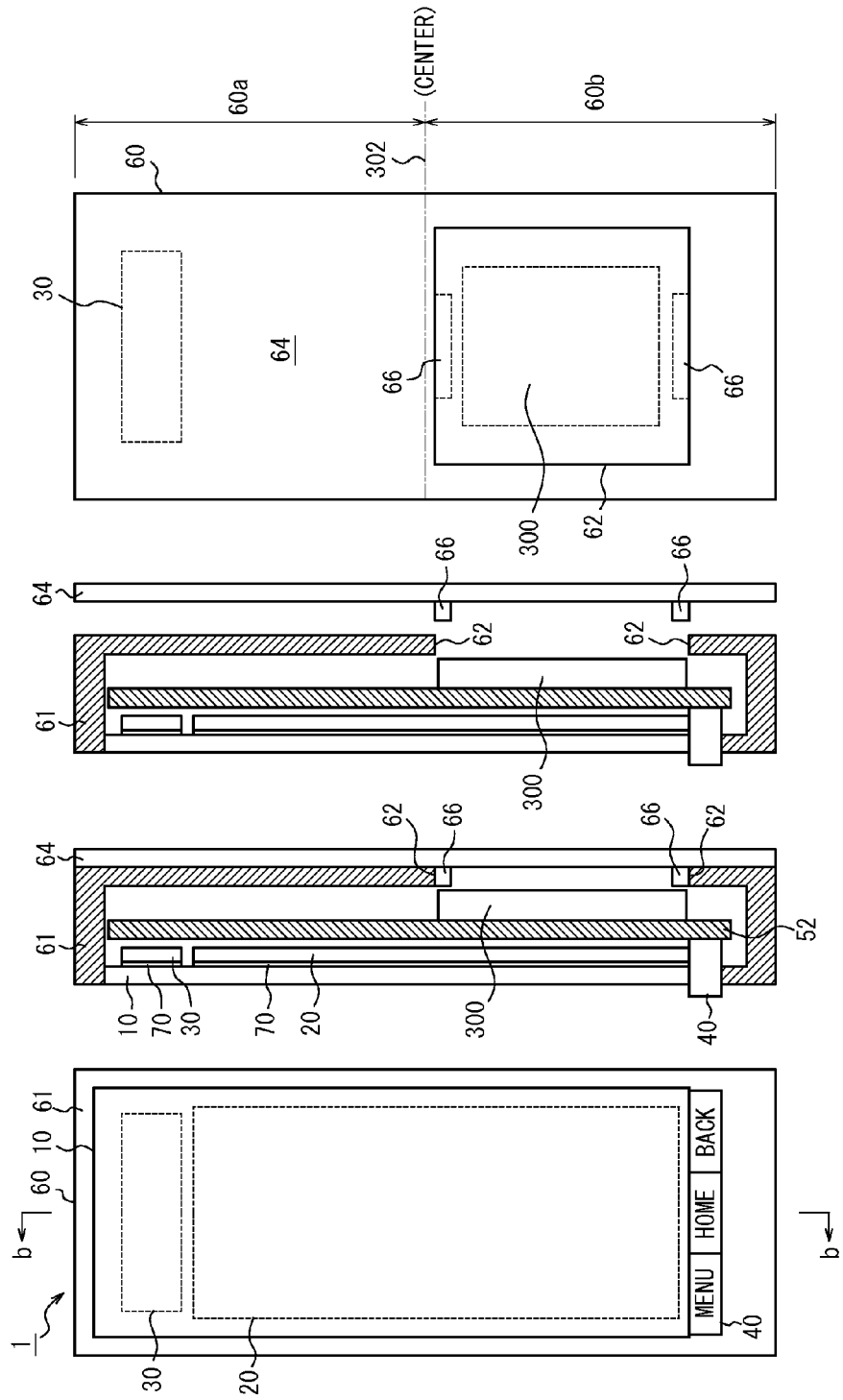
FIGS. 3A-3D illustrate a housing structure of the electronic device according to a first embodiment.

FIGS. 3A-3D illustrate diagrams of a housing structure of the electronic device 1 according to the first embodiment. FIG. 3A is a front view, and FIG. 3B is a cross-sectional view taken from line b-b of FIG. 3A. The electronic device 1 illustrated in FIGS. 3A-3C is a smart phone having the touch panel constituted by using a glass plate serving as the panel 10 disposed on a front face of a housing 60 (for example, a metallic or resin case).

A circuit board 52 having the panel 10, the input unit 40 and the control unit 50 provided thereto is supported by the housing 60. The housing 60 contains a battery 300 for supplying power to the display unit 20, the piezoelectric element 30, the input unit 40 and the control unit 50. An opening 62 for allowing removal and mounting of the battery 300 is provided on a rear face of the housing 60. The housing 60 also has a lid member 64 removably joined to the opening 62 for sealing the opening 62. FIG. 3B illustrates a state in which the lid member 64 is attached, and FIG. 3C illustrates a state in which the lid member 64 is removed.

A front face of the housing 60 having the panel 10 corresponds to a "first principle plane" to which the piezoelectric element 30 is fixed, and a rear face having the lid member 64 provided thereto corresponds to a "second principle plane opposite to the first principle plane". A portion of the housing 60 except where the panel 10 is fixed corresponds to a base portion 61.

Here, as an example, the lid member 64 is in the same size as the rear face of the housing 60 and becomes integrated therewith when joined to the housing 60. However, the size of the lid member 64 is not limited to this example but may be any size covering the opening 62. The lid member 64 is joined to the rear face of the housing 60, that is, the base portion 61 by using a joint portion 66. The joint portion 66 is, for example, a claw or the like inserted into the opening 62 and locks on an inner wall of the opening 62 due to its elasticity, or a claw for engaging with a cutout or a recess provided on the inner wall. The joint portion 66 may be either integrally formed on the lid member 14 or separated therefrom.

As illustrated in FIG. 3D, further, when the piezoelectric element 30 is provided in a direction parallel to the front face of the housing 60, for example, on a first side 60a (an upper side in FIG. 3D) in a longitudinal direction of the housing 60 in the rectangular shape, a joint position of the joint portion 66 is provided on 60b (a lower side in FIG. 3D) opposite to the first side 60a. Here, when the first side 60a and the second side 60b are separated from each other by a border 302 stretching in a direction parallel to the front face of the housing 60, for example, in a width direction orthogonal to the longitudinal direction at a center of the longitudinal direction, the piezoelectric element 30 is provided on the first side 60a, and the second side 60b corresponds to the other side. When the piezoelectric element 30 is provided across the border 302, the first side 60a includes a half or more of a region of the piezoelectric element 30, and the second side 60b corresponds to the other side.

When the piezoelectric element 30 vibrates the panel 10, the vibration of the panel 10 is transmitted to the base portion 61 via a joint between the base portion 61 of the housing 60 and the panel 10. Then, the vibration is transmitted to the joint portion 66 of the lid member 64 in contact with the base portion 61 at the opening 62. Since the joint portion 66 has some play from the base portion 61, the joint portion 66 rattles according to the vibration upon transmission of the vibration. However, the vibration transmitted to the base portion 61 attenuates according to a distance from the piezoelectric element 30 where the vibration is generated. According to the present embodiment, therefore, the joint position of the joint portion 66 (that is, for example, a position of the opening 62) is provided on the lower side 60b, instead of on the upper side 60a of the housing 60, where the piezoelectric element 30 is provided. Thereby, vibration transmitted to the joint portion 66 may be reduced in comparison to a case when the joint position of the joint portion 66 is provided on the upper side 60a together with the piezoelectric element 30. Accordingly, volume of noise caused by the vibration may be lowered.

Each of the display unit 20 and the piezoelectric element 30 is attached to the panel 10 by a joint member 70. The joint member 70 may be adhesive or a double-sided tape having the thermosetting property or the ultraviolet curable property such as, for example, the optical elastic resin, which is clear and colorless acrylic ultraviolet curable adhesive. Each of the panel 10, the display unit 20 and the piezoelectric element 30 is in approximately rectangular shapes.

The display unit 20 is disposed at approximately the center of the panel 10 in the width direction. The piezoelectric element 30 is disposed at a position separated from an end of the panel 10 in the longitudinal direction by a predetermined distance near the end in such a manner that a longitudinal direction of the piezoelectric element 30 stretches along a short periphery of the panel 10. The display unit 20 and the piezoelectric element 30 are disposed side by side in a direction parallel to the inner surface of the panel 10.

Figure 4:
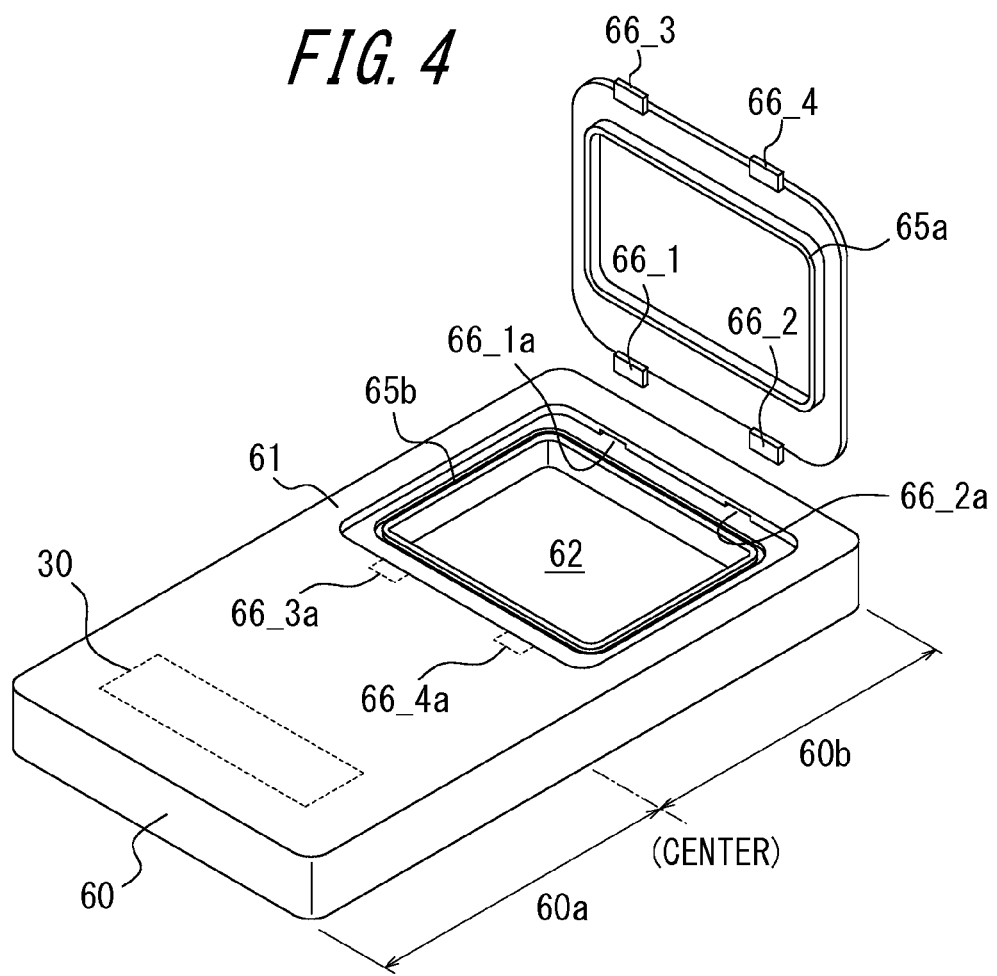
FIG. 4 is a perspective view of a housing 60 as an example.

FIG. 4 is a perspective view of the housing 60 as an example. In FIG. 4, the perspective view from the rear face of the housing 60 illustrates a state in which the lid member 64 is removed. The housing 60, on a side of the base portion 61 (here, that is, the rear side), has an opening 62 covered by the lid member 64. The opening 62 is provided on the side 60b opposite to the side 60a of the housing 60 having the piezoelectric element 30 attached thereto in the planar view. Here, a battery is omitted in the figure. The lid member 64 includes joint portions 66_1, 66_2, 66_3 and 66_4 joined to the opening 62. The joint portions 66_1 to 66_4 are, for example, claws protruding outside the lid member 64. When the lid member 64 is attached to the opening 62, the joint portions 66_1 to 66_4 are inserted into the opening 62 being elastically deformed as abutting an inner wall of the opening 62. Then, the joint portions 66_1 to 66_4, due to a bias force directing outside the opening 62, engages with, for example, cutouts or recesses 66_1a, 66_2a, 66_3a and 66_4a provided on the inner wall of the opening 62, respectively. Thereby, the lid member 64 is attached to the housing 60.

Also, the lid member 64 may have a packing portion 65a in a shape following a periphery thereof inside the joint portions 66_1 to 66_4. The packing portion 65a is made of an elastic member such as silicon, rubber or plastic. The packing portion 65a may be integrally formed with the lid member 64. On the other hand, inside the opening 62 of the base portion 61, a groove 65b may be provided for accommodating the packing portion 65a. When the packing portion 65a firmly contacts a corresponding portion inside the opening 62 and is accommodated in the groove 65b, a gap between the lid member 64 and the opening 62 is sealed, which may prevent water intrusion into the housing 60. In such a water-proof structure, when a joint position of the lid member 64 is disposed on the side 60b opposite to the side 60a having the piezoelectric element 30, degeneration of the packing portion 65a due to the vibration may be reduced, preventing deterioration of a water-proof property.

Figure 5:
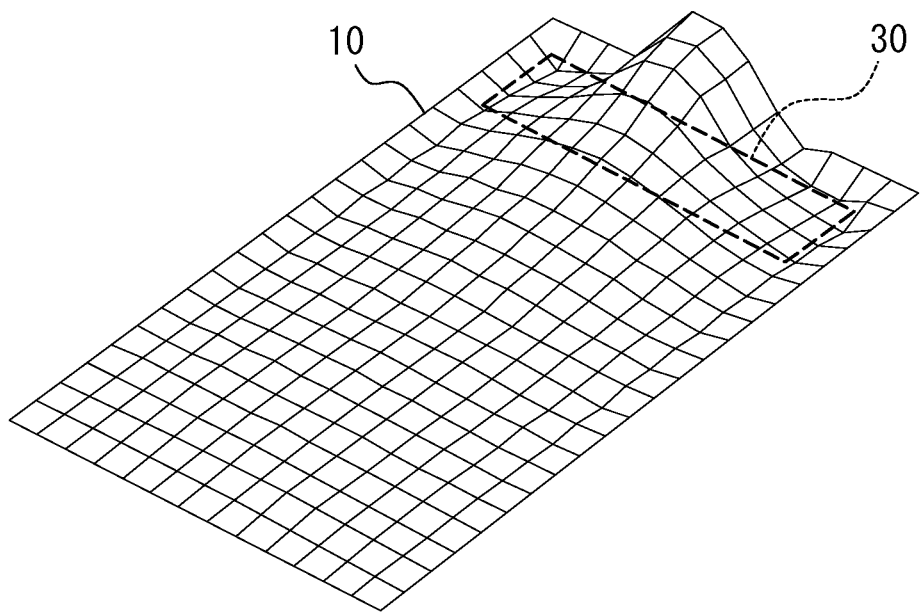
FIG. 5 is a diagram illustrating an example of vibration of the panel of the electronic device according to the first embodiment.

FIG. 5 is a diagram illustrating an example of vibration of the panel 10 of the electronic device 1 according to the first embodiment. In the electronic device 1 according to the first embodiment, the display unit 20 is attached to the panel 10. Therefore, the lower side of the panel 10 less vibrates than the upper side of the panel 10 where the piezoelectric element 30 is attached. The panel 10 is directly bent in its upper portion by the piezoelectric element 30, and vibration is dampened in the lower portion compared to the upper portion. The panel 10 is bent by the piezoelectric element 30 in the direction along the long side of the piezoelectric element 30 such that the portion of the panel 10 immediately above the piezoelectric element 30 rises higher than the adjacent portions. Accordingly, sound leakage caused by vibration of the lower portion of the panel 10 may be prevented.

According to the electronic device 1 of the present embodiment, also, the panel 10 is deformed due to deformation of the piezoelectric element 30 attached to the rear face of the panel 10, thereby the air conduction sound and the vibration sound are transmitted to an object in contact with the panel 10 being deformed. That is, the panel 10 as a part of the housing 60 is vibrated generating the air conduction sound and the human vibration sound. Accordingly, since the air conduction sound and the vibration sound may be transmitted to the user without a vibrating body protruding to an outer surface of the housing 60, usability is improved more than the electronic device described in Patent Document 1 which requires contact of a vibrating body, which is much smaller than the housing, to the human body. Also, since the user does not need to hold the piezoelectric element against the user's ear, the piezoelectric element 30 is not likely to be damaged. Moreover, when the housing 60 is deformed instead of the panel 10, the user is likely to drop the terminal because of generated vibration. On the other hand, when the panel 10 is vibrated, such a problem is not likely to occur.

The piezoelectric element 30 is attached to the panel 10 by the joint member 70. Accordingly, the piezoelectric element 30 may be attached to the panel 10 in a manner less limiting deformation flexibility thereof. Also, the joint member 70 may be adhesive having a non-thermosetting property, which offers an advantage that thermal stress contraction is not likely to occur between the piezoelectric element 30 and the panel 10 when the joint member 70 sets. Or, the joint member 70 may be the double-sided tape, which offers an advantage that less contraction stress is caused than that when the adhesive is used between the piezoelectric element 30 and the panel 10.

(Second Embodiment)

Figure 6A:
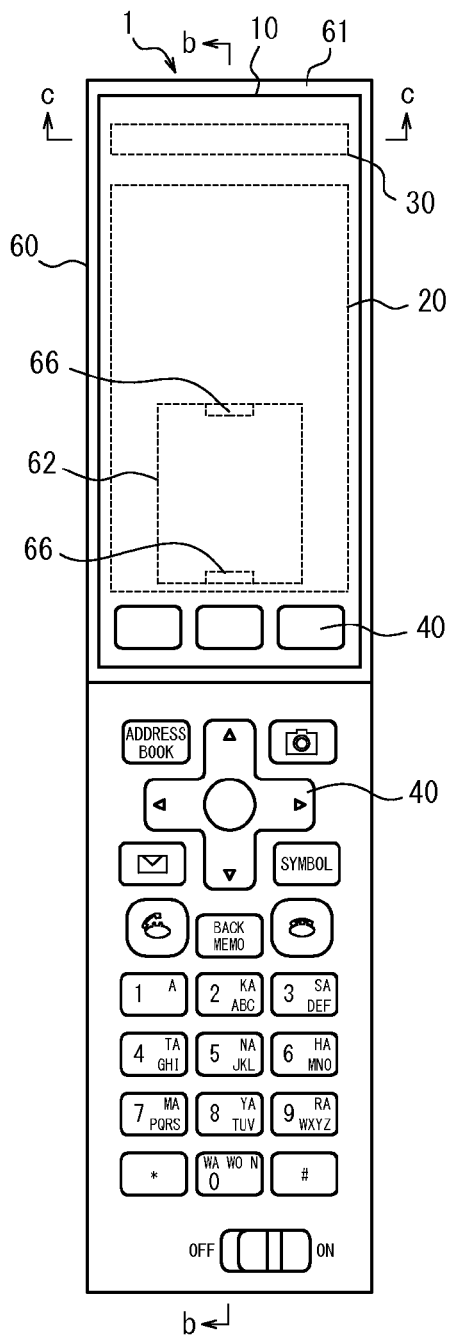
FIGS. 6A-6C illustrate a housing structure of the electronic device according to a second embodiment.
Figure 6B:
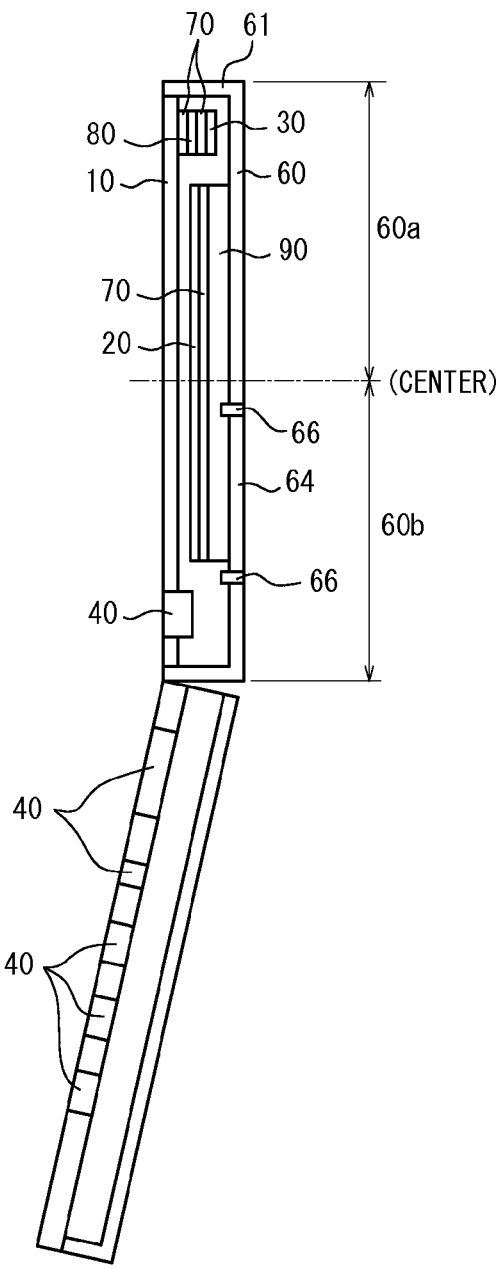
Figure 6C:
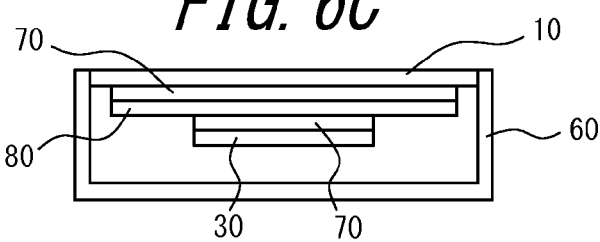

FIGS. 6A-6C illustrates diagrams of a housing structure of the electronic device 1 according to a second embodiment. FIG. 6A is a front view, FIG. 6B is a cross-sectional view taken from line b-b of FIG. 6A, and FIG. 6C is a cross-sectional view taken from line c-c of FIG. 6A. The electronic device 1 illustrated in FIGS. 6A-6C is a folding mobile phone having the cover panel (acrylic panel) for protecting the display unit 20 and serving as the panel 10 disposed on the front face of the housing 60 on the upper side thereof. The joint position of the joint portion 66 of the lid member 64 is provided on the side 60b, instead of the side 60a of the housing 60 having the piezoelectric element 30 provided thereto. Thereby, in the same manner as the first embodiment, the noise generated by vibration of the piezoelectric element 30 transmitted to the joint portion 66 via the base portion 61 of the housing 60 and deterioration of the packing portion provided to the joint portion 66 may be reduced.

According to the second embodiment, a reinforcement member 80 is disposed between the panel 10 and the piezoelectric element 30. The reinforcement member 80 is, for example, a resin plate including a sheet metal or glass fiber. That is, the electronic device 1 according to the second embodiment includes the piezoelectric element 30 and the reinforcement member 80 attached to each other by the joint member 70 and the reinforcement member 80 and the panel 10 attached to each other also by the joint member 70. According to the second embodiment, also, the display unit 20 is not attached to the panel 10 but supported by the housing 60. That is, in the electronic device 1 according to the present embodiment, the display unit 20 is separated from the panel 10, and the display unit 20 and a support 90 serving as a part of the housing 60 are attached to each other by the joint member 70. The support 90 does not need to be a part of the housing 60 but may be a metallic or resin member independent of the housing 60.

Figure 7:
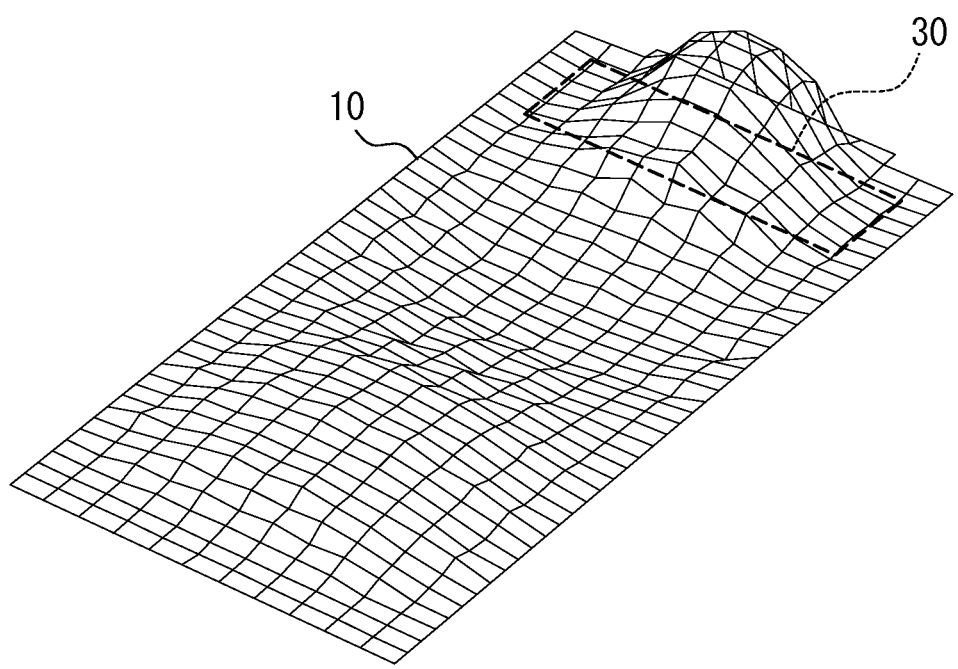
FIG. 7 is a diagram illustrating an example of vibration of the panel of the electronic device according to the second embodiment.

FIG. 7 is a diagram illustrating an example of vibration of the panel 10 of the electronic device 1 according to the second embodiment. In the electronic device 1 according to the second embodiment, the panel 10 is constituted by using an acrylic plate having less rigidity than the glass plate. Since the display unit 20 is not attached to the rear face of the panel 10, amplitude generated by the piezoelectric element 20 is larger than that of the electronic device 1 according to the first embodiment illustrated in FIG. 5. Also, both of the attachment area of the panel 10 having the piezoelectric element 30 attached thereto and the region separated from the attachment area are vibrated. Therefore, the user may hear the vibration sound, as well as the air conduction sound transmitted through the air, by contacting the user's ear to any portion of the panel 10.

According to the electronic device 1 of the present embodiment, as described above, the reinforcement member 80 and the panel 10 are deformed due to deformation of the piezoelectric element 30 attached to the panel 10 by using the reinforcement member 80, thereby the air conduction sound and the vibration sound are transmitted to the object in contact with the panel 10 being deformed. Accordingly, the air conduction sound and the human body vibration sound may be transmitted to the user without the necessity of holding the vibrator against the user's ear. Also, the piezoelectric element 30 is attached to the inner surface of the housing 60 of the panel 10. Therefore, the air conduction sound and the human body vibration sound may be transmitted to the user without the necessity of protruding the vibrator to the external surface of the housing 60. Also, the panel 10 deforms, as well as in the attachment region having the piezoelectric element 30 attached thereto, at any portion thereof for transmitting the air conduction sound and the vibration sound. Accordingly, the user may hear, in addition to the air conduction sound transmitted through the air, the vibration sound through human body by contacting the user's ear to any portion of the panel 11.

Since the reinforcement member 80 is disposed between the piezoelectric element 30 and the panel 10, when an external force is applied on the panel 10, for example, there is a less possibility for the external force to be transmitted to the piezoelectric element 30 and damage the piezoelectric element 30. Also, even if the panel 10 is pressed against the human body, the vibration of the panel 10 becomes less attenuated. Further, since the reinforcement member 80 is disposed between the piezoelectric element 30 and the panel 10, a resonance frequency of the panel 10 becomes low and an acoustic property in a low frequency band is improved. Note that, instead of the reinforcement member 80, a plate-shaped anchor may be attached to the piezoelectric element 30 by using the joint member 70.

Although the present invention is described based on the figures and the embodiments, it is to be understood that those who are skilled in the art may easily vary or alter in a multiple manner based on disclosure of the present invention. Accordingly, such variation and alteration are included in a scope of the present invention. For example, each member and each function and the like included in each step may be rearranged avoiding a logical inconsistency, so as to combine a plurality of components or steps, or to divide them.

Figure 8:
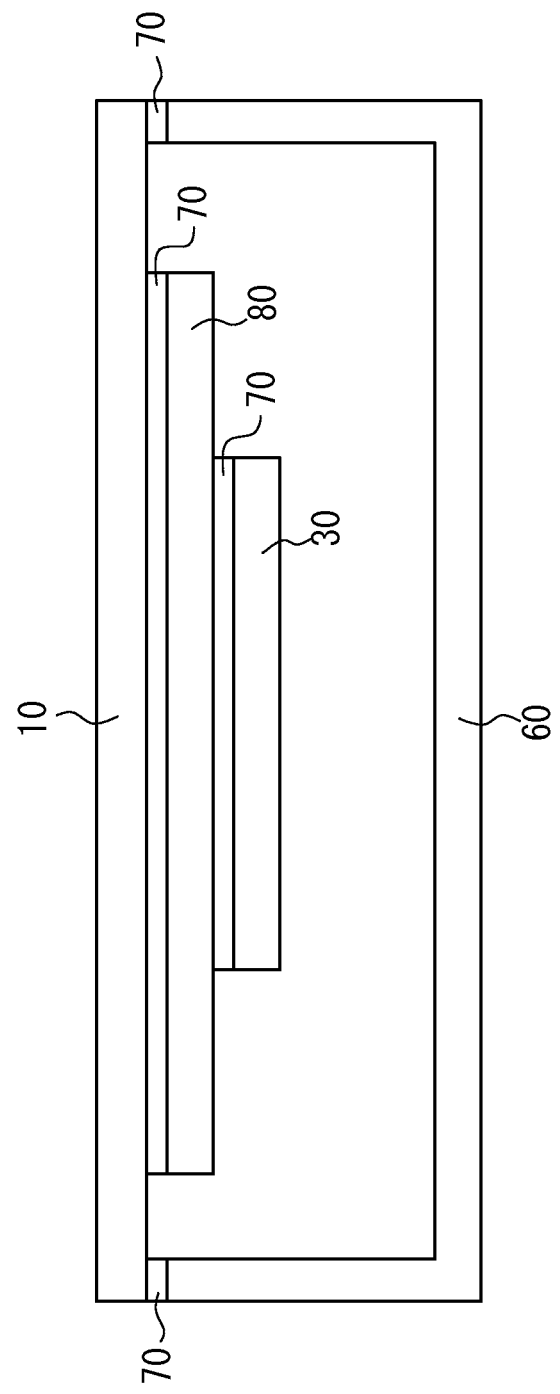
FIG. 8 is a diagram illustrating an example of joint of the panel and the housing.

As illustrated in FIG. 8, for example, the panel 10 may be joined to the housing 60 by the joint member 70. When direct transmission of the vibration from the panel 10 to the housing 60 is suppressed in this manner, a risk for the user to drop the electronic device 1 may be reduced in comparison to when the housing itself vibrates strongly. Also, the joint member 70 may be adhesive having the non-thermosetting property, which offers an advantage that thermal stress contraction is not likely occur between the housing 60 and the panel 10 when the joint member 70 sets. Further, the joint member 70 may be the double-sided tape, which offers an advantage that contraction stress is not likely caused unlike when using the adhesive between the housing 60 and the panel 10.

For example, when the panel 10 and the display unit 20 do not overlap with each other, the piezoelectric element 30 may be disposed at a center of the panel 10. When the piezoelectric element 30 is disposed at the center of the panel 10, the vibration of the piezoelectric element 30 evenly reaches the entire panel 10, thus quality of the air conduction sound may be improved and the human body vibration sound may be perceived by the user when the user contacts the ear to various portions of the panel 10. Also, in a similar manner to the above embodiments, a plurality of piezoelectric elements 30 may be attached.

Also, the panel 10 may constitute any of or all of a display panel, an operation panel and the cover panel. When the panel 10 constitutes the display panel, the piezoelectric element 30 may be disposed outside a display area for performing a display function. Such an arrangement offers an advantage to diminish disturbance of a display. The operation panel includes the touch panel according to the first embodiment. Or, the operation panel includes sheet keys serving as members constituting one plane of the housing of, for example, the folding mobile phone having the operation unit where key tops of the operation keys are integrally formed.

Note that, according to the first and second embodiments, both of the joint member for attaching the panel 10 and the piezoelectric element 30 to each other and the joint member for attaching the panel 10 and the housing 60 are referred to as the joint member 70. However, different joint members may be used appropriately in the first and second embodiments based on members to be attached.

Further, according to the first and second embodiments, the joint portion 66 is used, as an example, for joining the lid member 64 for sealing the opening for allowing removal/mounting of the battery to the housing 60. However, the joint portion may be used for joining a lid member for sealing other than the battery such as, for example, a storage medium, a circuit component, or a terminal or an opening for removal/attachment of a battery plug or the like, or for joining other peripheral equipments to the housing 60.

What is claimed is:
1. An electronic device comprising:
a piezoelectric element;
a housing which has a first principle plane having the piezoelectric element fixed thereto and a second principle plane opposite to the first principle plane; and
a lid member having a joint portion for removably joining to the second principle plane, wherein
the electronic device causes the housing to generate sound transmitted by vibrating a part of a human body,
the piezoelectric element is provided only on a first side of the housing with respect to a center of a length of the housing in a first direction parallel to the first principle plane,
a joint position of the joint portion is provided only on a second side of the housing opposite to the first side with respect to the center of the length of the housing in the first direction,
the first principle plane of the housing includes a vibrating plate having the piezoelectric element fixed thereto and constituting an exterior side of the electronic device,
the housing includes a base portion for joining the vibrating plate and the joint portion, and
the piezoelectric element is configured to be vibrated by a voltage corresponding to an audio signal.

2. The electronic device according to claim 1, wherein the joint portion has a packing portion provided along a periphery thereof.

3. The electronic device according to claim 2, wherein the base portion has a groove for accommodating the packing portion.

4. The electronic device according to claim 1, wherein a length of the first direction of the vibrating plate in a planar view is equal to or longer than a length between the antitragus and the inferior antihelix crus.

5. The electronic device according to claim 1, wherein a length of a direction intersecting with the first direction of the vibrating plate in the planar view is equal to or longer than a length between the tragus and the inferior antihelix.

6. The electronic device according to claim 1, wherein the piezoelectric element is attached and fixed to the vibrating plate by using a joint member.

7. The electronic device according to claim 6, wherein the joint member is non-heating type hardening adhesive.

8. The electronic device according to claim 6, wherein the joint member is a double-sided tape.

9. The electronic device according to claim 1, wherein the vibrating plate is attached to the housing by using the joint member.

10. The electronic device according to claim 9, wherein the joint member is non-heating type hardening adhesive.

11. The electronic device according to claim 9, wherein the joint member is a double-sided tape.

12. The electronic device according to claim 1, wherein the vibrating plate constitutes any of or all of a display unit, an input unit and a display unit cover.

13. The electronic device according to claim 1, wherein the piezoelectric element is fixed to the vibrating plate at a position outside an area of the vibrating plate overlapping with the display unit in the planar view.

14. The electronic device according to claim 1 further causing the housing to generate air-conducted sound.

* * * * *